(12) United States Patent
Adamy

(10) Patent No.: US 7,434,535 B2
(45) Date of Patent: Oct. 14, 2008

(54) TIMING DEVICE

(75) Inventor: Steven T. Adamy, Lawrenceville, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 536 days.

(21) Appl. No.: 10/749,685

(22) Filed: Dec. 31, 2003

(65) Prior Publication Data

US 2005/0141348 A1 Jun. 30, 2005

(51) Int. Cl.
*G01D 21/00* (2006.01)
(52) U.S. Cl. .................................... 116/206; 368/327
(58) Field of Classification Search ............... 116/206, 116/216–219; 374/161, 162, 106; 368/114, 368/327
See application file for complete search history.

(56) References Cited

U.S. PATENT DOCUMENTS

| | | | | |
|---|---|---|---|---|
| 2,560,537 A | 7/1951 | Andersen | | 99/192 |
| 2,671,028 A | 3/1954 | Clark | | 99/192 |
| 3,242,733 A | 3/1966 | Johnson | | 73/344 |
| 3,414,415 A | 12/1968 | Broad, Jr. | | 99/192 |
| 3,420,635 A | * 1/1969 | Davis | | 116/206 |
| 3,479,877 A | 11/1969 | Allen et al. | | 73/358 |
| 3,520,124 A | * 7/1970 | Myers | | 116/206 |
| 3,542,519 A | * 11/1970 | Kedzie et al. | | 116/200 |
| 3,751,382 A | 8/1973 | Ljungberg et al. | | 252/408 |
| 3,768,976 A | 10/1973 | Hu et al. | | 23/254 |
| 3,942,467 A | 3/1976 | Witonsky | | 116/114 |
| 3,951,098 A | 4/1976 | Meyers | | 116/114 |
| 3,996,007 A | 12/1976 | Fang et al. | | 23/253 |
| 4,028,876 A | 6/1977 | Delatorre | | 116/114 |
| 4,212,153 A | * 7/1980 | Kydonieus et al. | | 116/216 |
| 4,229,813 A | * 10/1980 | Lilly et al. | | 116/206 |
| 4,248,597 A | * 2/1981 | McNeely | | 116/206 |
| 4,382,700 A | * 5/1983 | Youngren | | 116/216 |
| 4,408,557 A | 10/1983 | Bradley et al. | | 116/206 |
| 4,629,330 A | * 12/1986 | Nichols | | 116/216 |
| 4,788,151 A | * 11/1988 | Preziosi et al. | | 116/206 |
| 5,045,283 A | * 9/1991 | Patel | | 116/206 |
| 5,053,339 A | * 10/1991 | Patel | | 436/2 |
| 5,057,434 A | * 10/1991 | Prusik et al. | | 116/217 |
| 5,110,718 A | * 5/1992 | Tanji et al. | | 430/546 |
| 5,602,804 A | 2/1997 | Haas | | 368/327 |
| 5,630,372 A | * 5/1997 | Ramsey et al. | | 116/206 |
| 5,707,680 A | * 1/1998 | Moore | | 116/206 |
| 5,756,356 A | * 5/1998 | Yanagi et al. | | 116/206 |
| 5,997,927 A | * 12/1999 | Gics | | 116/216 |
| 6,244,208 B1 | * 6/2001 | Qiu et al. | | 116/207 |
| 6,269,764 B1 | 8/2001 | Adamy et al. | | 116/206 |

(Continued)

FOREIGN PATENT DOCUMENTS

JP        60093983 A   *   5/1985

(Continued)

*Primary Examiner*—R. A. Smith
*Assistant Examiner*—Amy Cohen Johnson
(74) *Attorney, Agent, or Firm*—Frenkel & Associates; Stuart D. Frenkel; Phillip R. Kiefer

(57) ABSTRACT

A timing device for visually determining the passage of a preselected period of time including a redox indicator and a metal salt wherein the indicator undergoes an observable change in color which is related to the desired preselected period of time.

8 Claims, 1 Drawing Sheet

U.S. PATENT DOCUMENTS

| | | | |
|---|---|---|---|
| 6,270,724 B1 * | 8/2001 | Woodaman | 116/106 |
| 6,314,907 B1 * | 11/2001 | Harris et al. | 116/206 |
| 6,373,786 B1 * | 4/2002 | Kagan et al. | 368/10 |
| 2004/0240324 A1 * | 12/2004 | Isbitsky et al. | 368/327 |
| 2005/0078557 A1 * | 4/2005 | Andersen | 116/206 |

FOREIGN PATENT DOCUMENTS

JP  01202660 A * 8/1989

* cited by examiner

TIMING DEVICE

FIELD OF THE INVENTION

The present invention is directed to a timing device for visually determining the passage of a preselected period of time and is applicable to a wide variety of consumer products, especially products which have an extended shelf or use life and for which it is desirable to know when the product must be replaced or rejuvenated. The timing device can be attached to or incorporated in typical packaging employed for consumer products.

BACKGROUND OF THE INVENTION

Consumer products including food products, cleaning products, deodorizers and the like have a shelf life determined by the length of time the components of the product resist change to environmental influences. For example, food products have a given shelf life based on their ability to resist chemical or physical changes due to contact with air, heat and other influences in the environment. Many consumer products are date stamped to provide the user with an indication of the shelf life of the product. The shelf life may be relatively short such as a few days or may be relatively lengthy such as a few months. Date stamping of consumer products provides the user with some indication of when the product may no longer be useful for its intended purpose.

Quite often, date stamps are printed inconspicuously on the product package. It is sometimes difficult to read the date stamp and in some cases even to find the date stamp because it may be printed anywhere on the package. Date stamping is particularly problematic for products which have a relatively long shelf life because such products tend to get stored in obscure recesses of a storage area, such as a food cabinet or refrigerator. If the product is not used often, the consumer is often unaware that the expiration date is shortly forthcoming or has even passed.

There have been attempts to provide a visible indication of when the useful life of a product has expired. So called life time indicators are employed for food products such as are disclosed in U.S. Pat. Nos. 2,671,028; 3,751,382; and 3,942,467. These indicators typically work through chemical reactions initiated or increased in rate by exposure to high temperatures. Other lifetime indicators rely on diffusion of a component through a traditional wick or membrane as disclosed in U.S. Pat. Nos. 3,414,415; 3,479,877 and 3,768,976, each of which is incorporated herein by reference.

Examples of other such products which incorporate useful life indicators include, for example, certain toothbrush wear indicators which are based on the diffusion of a dye out of the bristles. When the color of a select group of bristles disappears, the user is aware that the toothbrush may or should be discarded and replaced. Another example is found in a deodorizer product having a timer based on the evaporation of a solvent from a polymer gel and subsequent shrinkage of the gel.

The timing indicators mentioned above suffer from one or more disadvantages which makes their universal applicability to a wide range of packaged products problematical. Such disadvantages include a) the timing mechanism is part of the product (e.g. a deodorizer) and is therefore limited to employment with that product or that class of products, b) the timing mechanism is inaccurate or cannot be controlled to accommodate a wide range of product shelf lives, c) the timing mechanism is expensive and/or d) has a limited range of measurement.

U.S. Pat. No. 6,269,764 discloses a timing device which overcomes at least some of the problems mentioned above. The device disclosed in that patent is in the form of an inverted U-shaped tube with at least one of the opposed ends having opposed reservoirs for storing a reactant and an indicator with a wick employed to enable the reactant to contact the indicator thereby initiating a color change over a preselected period of time.

It would be an advance in the art of providing visible indicators for determining when a product should be replaced or rejuvenated if a cost efficient and effective shelf life indicator could be provided which provides a clear and distinct visible indication of when a product should be replaced or rejuvenated and does so without employing a wicking material so as to reduce the cost of the device.

SUMMARY OF THE INVENTION

The present invention is generally directed to a shelf life indicator, hereinafter referred to as a timing device, for determining the point at which a product has expired, or needs to be changed, etc., and visually displaying the same. In addition, the invention is directed to a timing device applicable to a wide range of consumer products and packages containing the same. The timing device can be applied to products which have a relatively short shelf life (e.g. dairy products including milk) and products which have a fairly long shelf life such as canned vegetables.

In a particular aspect of the present invention, there is provided a timing device for determining and visually indicating the passage of a preselected period of time. The invention is based on the principle that certain redox indicators undergo a color change with a change in oxidation state. A redox couple may be formed between a redox indicator and another material, such as a metal ion.

Indigo carmine, for example, exhibits a yellow (pH 7) or colorless (acidic pH) color in its reduced form but a blue color in its oxidized form. As another example, neutral red exhibits no color in its reduced form, but exhibits a red color in its oxidized form.

The reactions set forth below demonstrate a redox couple at pH 2 between indigo carmine and $Sn^{2+}$. The indigo carmine, in its oxidized form ($IC_{Ox}$), is changed to its reduced form ($IC_{Red}$) and the $Sn^{2+}$ is oxidized:

$$IC_{Ox} + 2H^+ + 2e^- \leftrightarrows IC_{Red} \tag{1a}$$

$$Sn^{2+} \leftrightarrows Sn^{4+} + 2e^- \tag{1b}$$

Following reactions 1a and 1b, the indigo carmine, in its reduced state, is colorless or yellow, depending on the pH. According to the present invention, the above-described reactions are carried out in a matrix containing a film-forming polymer, such as a cellulose derivative such as hydroxyethyl or hydroxypropyl cellulose or mixtures thereof. In one embodiment, a polymer solution, with the reduced indicator therein, can be drawn out into a film and allowed to dry. In some of the examples set forth below the film was drawn out onto glass slides for easy observation and handling. In other examples, the firm was drawn onto an adhesive backed polyester film which permitted the fabrication of timers having the form of small stickers. Although the invention is not limited to timers in the form of stickers, such stickers are a particularly useful embodiment of the invention, as the stickers could be applied, for example, to the surface of a consumer product, or to the surface, either interior or exterior, of a refrigerator, a freezer or other cabinet or container. According to the invention, such a sticker could be constructed such that it would undergo a color change following a pre-selected period of time.

A film containing the reduced indicator may be exposed to air, and over a period of time the redox indicator slowly re-oxidizes. In the case of the indigo carmine, the indicator gradually turns from a yellow-orange shade to a brilliant blue. The rate at which the color change occurs depends on factors such as the ratio of redox indicator to oxidizable metal, the particular metal salt used, film thickness, and temperature. These are parameters which may be selected to construct a timer which will change color after the elapse of a pre-selected period of time, typically several days, weeks, or months. Ratios of indicator to metal ion salt may typically vary from about 1:30 to about 1:2. The metal ion may be any ion able to undergo oxidation with the subsequent reduction of an appropriate indicator. Examples of such metal ions include $Sn^{2+}$, $Cu^+$, $Fe^{2+}$, $Mn^{2+}$, $Pb^{2+}$, $Ti^{n+}$ (n=2, 3), and $Vn^{n+}$ (n=1,2,3,4). The thickness of the film may vary with the permeability of the film-former employed, but typically will range from about 5 to 50 mil (127 to 1270 μm), measured on the wet film. By varying these parameters a timer may be constructed which will undergo a color change in a given number of days at a given temperature, and that given temperature may, for example, be freezer temperature, refrigerator temperature, ambient temperature, or an elevated temperature.

DETAILED DESCRIPTION OF THE INVENTION

Figure 1:
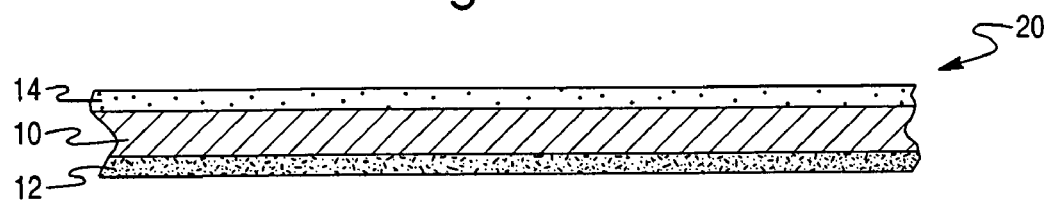
FIG. 1 is a cross-sectional view of the timing device of this invention placed on an adhesive-backed film.

FIG. 1 shows the device 20 of the present invention in which a polymer film 10, such as a polyester film containing an adhesive layer 12 is coated with a matrix layer 14 having mixed therein a redox indicator and a metal ion.

Figure 2A:
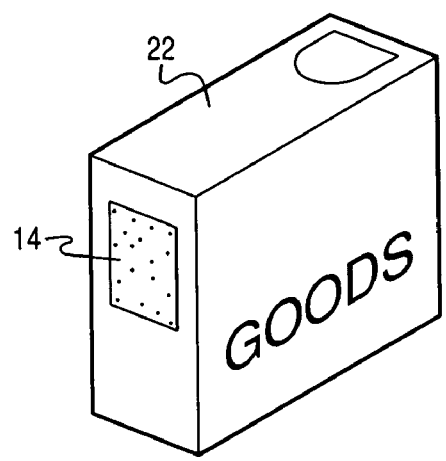
FIG. 2A is a depiction of the timing device of this invention placed on a box containing a consumer good.
Figure 2B:
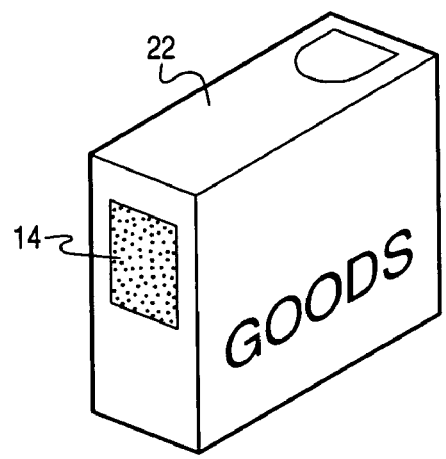
FIG. 2B is a depiction of the timing device of this invention placed on a box containing a consumer good and after a period of time indicating color change of the timing device.

FIGS. 2A and 2B show a container 22 containing a consumer good in which the timing device 20 such as shown in FIG. 1 is adhered thereto. FIG. 2A shows timing device 20 having an initial color and FIG. 2B shows a color change of timing device 20 upon the passage of time and exposure to air, thus, indicating a change of freshness of the goods within the container.

The following examples demonstrate the invention, but should not be construed as limiting it.

EXAMPLE 1

The following composition which contains both a film former and a redox indicator was prepared.

TABLE 1

| Component | Order of Addition | Wt. % |
|---|---|---|
| Water | 1 | 32.84 |
| Methanol | 2 | 64.28 |
| Hydroxyethyl cellulose (Natrosol 250 HR CS) | 3 | 1.31 |

TABLE 1-continued

| Component | Order of Addition | Wt. % |
|---|---|---|
| $SnCl_2 \cdot 2H_2O$ | 4 | 1.31 |
| Indigo Carmine | 5 | 0.26 |

After initial agitation, the mixture was allowed to mix overnight on a gently rocking platform. The mixture changed color from a deep blue to a light teal.

A film of the composition was then drawn on a glass slide with a controlled thickness applicator. In this case, a BYK-Gardner Square Multiple Clearance Applicator, model PAR-S3S1, was employed to deposit the film on the slide. The thickness of the film (wet) was 20 mil. The film was allowed to air dry overnight. The dry film then exhibited an orange-yellow color.

The bottom half of the film area on the glass slide was wrapped in clear plastic adhesive tape while the top half was left exposed to air. This left an exposed area of approximate dimensions 1"×1". The dry film was placed in a refrigerator at 40° F. Changes in the color of the exposed top half from orange to blue were observed.

Changing of the entire exposed area from orange to blue occurred in 45±3 days.

EXAMPLE 2

The following composition was prepared.

TABLE 2

| Component | Order of Addition | Wt. % |
|---|---|---|
| Water | 1 | 32.88 |
| Methanol | 2 | 64.37 |
| Hydroxyethyl cellulose (Natrosol 250 HR CS) | 3 | 1.31 |
| $SnCl_2 \cdot 2H_2O$ | 4 | 1.31 |
| Indigo Carmine | 5 | 0.13 |

The composition was mixed as in Example 1. A 20 mil film was also drawn and set up for aging employing the procedure set forth in Example 1. The color change occurred over a period of about 55±6 days.

EXAMPLE 3

The film described in Example 1 was aged at room temperature (72±3° F.). The size of the film was about ½"×1", and the bottom (covered) half also went through a color change. In this case, it appears that the barrier properties of the adhesive tape were not sufficient to prevent oxygen exposure at room temperature.

The color change occurred over a period of about 22 to 30 days.

EXAMPLE 4

The following composition was prepared:

TABLE 3

| Component | Order of Addition | Wt. % |
|---|---|---|
| Water | 1 | 32.88 |
| Methanol | 2 | 64.37 |

TABLE 3-continued

| Component | Order of Addition | Wt. % |
|---|---|---|
| Hydroxyethyl cellulose (Natrosol 250 HR CS) | 3 | 1.31 |
| SnCl$_2$•2H$_2$O | 4 | 1.31 |
| Methylene blue | 5 | 0.13 |

The mixture was initially blue, but gradually turned whitish-gray. As in Example 1, a film was drawn at a wet thickness of 20 mil. After drying overnight, the film was placed in a refrigerator (40° F.). The bottom half of the film was wrapped in an adhesive film while the top half of the film was exposed to the air. The exposed half of the film underwent a color change from white to blue over a period of about 48 days, and continued to darken with a more intense blue up to about 95 days.

EXAMPLE 5

The compositions set forth in Table 4 were prepared. As seen therein, the compositions contained 1:10 ratios of indigo carmine/SnCl$_2$.2H$_2$O, as well as base polymers of either hydroxyethyl cellulose (HEC, Natrosol 250 HR CS, from Hercules) or hydroxypropyl cellulose (HPC, Klucel H CS, from Hercules), or combinations thereof. Composition A was applied as both a 20 mil (wet) film and as a 40 mil (wet) film, whereas the remaining three (3) Compositions B, C and D were all applied as 20 mil (wet) films. All of the films were drawn on adhesive-backed polyester film under a nitrogen blanket. The films were additionally allowed to dry under the nitrogen blanket.

TABLE 4

| COMPONENT | ORDER OF ADDITION | WT. % A | B | C | D |
|---|---|---|---|---|---|
| Methanol | 1 | 64.37 | 64.37 | 64.37 | 64.37 |
| Deionized Water | 2 | 32.88 | 32.88 | 32.88 | 32.88 |
| Hydroxyethyl cellulose (Natrosol 250 HR CS) | 3 | 1.31 | — | 0.44 | 0.87 |
| Hydroxypropyl cellulose (Klucel H CS) | 4 | — | 1.31 | 0.87 | 0.44 |
| SnCl$_2$•2H$_2$O | 5 | 1.31 | 1.31 | 1.31 | 1.31 |
| Indigo Carmine | 6 | 0.13 | 0.13 | 0.13 | 0.13 |

Films A (both 20 and 40 wet mil thickness) and B were then exposed to air at temperatures of 0° F., 40° F., or room temperature (RT=72±3° F.). Films C and D were exposed to air at 0° F. and 40° F.

Times at which color changes occurred from orange to blue for (wet) film thickness of 20 and 40 mil, and temperatures of 0° F., 40° F., and RT, are summarized in Table 5.

TABLE 5

| Wet film thickness | Time required for color change (days) | | |
|---|---|---|---|
| Composition A | 0° F. | 40° F. | RT |
| 20 mil | 118 ± 7 | 56 ± 6 | 10 ± 5 |
| 40 mil | 102 ± 8 | 96 ± 14 | 102 ± 8 |

The color progressions of films drawn from Composition B are summarized in Table 6.

TABLE 6

| Wet film thickness | Time required for color change (days) | | |
|---|---|---|---|
| Composition B | 0° F. | 40° F. | RT |
| 20 mil | 72 ± 11 | 20 ± 6 | 3 ± 2 |

The color progressions of films drawn from Composition C are summarized in Table 7.

TABLE 7

| Wet film thickness | Time required for color change (days) | |
|---|---|---|
| Composition C | 0° F. | 40° F. |
| 20 mil | 99 ± 8 | 28 ± 7 |

The color progressions of films drawn from Composition D are summarized in Table 8.

TABLE 8

| Wet film thickness | Time required for color change (days) | |
|---|---|---|
| Composition D | 0° F. | 40° F. |
| 20 mil | 79 ± 13 | 51 ± 6 |

What is claimed is:

1. A timing device for visually determining the passage of a preselected period of time comprising:
   a redox couple containing a redox indicator in combination with a reactable metal ion, said redox couple deposed within a matrix, said matrix being exposable to air such that over a period of time during exposure to air, the redox indicator changes color and thereby indicates the passage of a predetermined period of time.

2. The timing device of claim 1 wherein the matrix is a film-forming polymer.

3. The timing device of claim 2 wherein the film-forming polymer is a cellulose derivative.

4. The timing device of claim 2 wherein said matrix has a thickness based on a wet film of said polymer of from 5 to 50 mil.

5. The timing device of claim 1 wherein the matrix is attached to an adhesive tape and is adhered to a package containing a consumer product.

6. The timing device of claim 1, wherein the redox indicator is selected from the group consisting of indigo carmine and methylene blue.

7. The timing device of claim 1, wherein the metal ion is Sn$^{2+}$.

8. A method for determining when a consumer product has reached an end to its useful shelflife comprising:
   preparing a timing device comprising a redox couple containing a redox indicator and a reactable metal ion, said redox couple deposed within a matrix, said matrix being exposable to air;
   attaching the timing device to an outside surface of the consumer product;
   observing the timing device for color changes, which color changes coincide with the end of the useful shelflife of the said consumer product.

* * * * *